United States Patent [19]
Li et al.

[11] Patent Number: 4,695,240
[45] Date of Patent: Sep. 22, 1987

[54] APPARATUS FOR EXTRUDING SMALL QUANTITIES OF MATERIAL

[75] Inventors: Hsin L. Li, Parsippany; Dusan C. Prevorsek, Morristown, both of N.J.

[73] Assignee: Allied Corporation, Morris Township, Morris County, N.J.

[21] Appl. No.: 596,497

[22] Filed: Apr. 4, 1984

[51] Int. Cl.$^4$ ............................................. B29C 47/00
[52] U.S. Cl. ................................ 425/207; 222/146.5; 222/272; 366/85; 425/378 R; 425/548; 425/378 S; 425/548; 425/550; 425/551
[58] Field of Search ................ 425/378 R, 378 S, 207, 425/542, 547, 548, 551, 550; 366/83, 85, 79; 222/146.5, 272

[56] References Cited

U.S. PATENT DOCUMENTS

| | | | |
|---|---|---|---|
| 696,575 | 4/1902 | Lee | 366/83 |
| 2,574,907 | 11/1951 | Bücken | 425/378 |
| 2,587,930 | 3/1952 | Uschmann | 425/378 |
| 2,707,306 | 5/1955 | Weber et al. | 425/378 S |
| 2,774,107 | 12/1956 | Davis | 425/378 R |
| 3,256,562 | 6/1966 | Heard et al. | 425/378 |
| 3,305,893 | 2/1967 | Machen | 425/378 |
| 3,547,261 | 12/1970 | Koch | 366/85 |
| 3,743,252 | 7/1973 | Schott | 425/378 R |
| 3,924,841 | 12/1975 | Shinmoto | 425/208 |
| 4,058,298 | 11/1977 | Duska et al. | 366/79 |
| 4,319,871 | 3/1982 | McAlister | 425/378 R |

FOREIGN PATENT DOCUMENTS 2061700  7/1971  Fed. Rep. of Germany ... 425/378 R

OTHER PUBLICATIONS

Leistritz Applications Bulletin, American Leistritz Extruder Corporation, 1983.
Leistritz Information-Technical Bulletin 20, Leistritz Maschinenfabrik GmbH, 1980.
Leistritz Information-Technical Bulletin 22, Leistritz Maschinenfabrik GmbH, 1980.
Leistritz Extrusilnstechnik, Leistritz Maschinenfabrik GmbH, Oct. 1979.
Egan Extruders-Bulletin No. 202, Frank E. Egan & Company, Oct. 1968.
Chris J. Rauwendaal, "Analysis and Experimental Evaluation of Twin Screw Extruders", Polymer Engineering and Science, vol. 21, No. 16, Nov. 1981, pp. 1092-1100.
William Thiele, "Expanding Uses for Counter-rotating, Intermeshing, Twin Screw Extruders".
Plastics Compounding (1981, Industry Media Inc.).

Primary Examiner—Willard E. Hoag
Attorney, Agent, or Firm—Gus T. Hampilos; Gerhard H. Fuchs

[57] ABSTRACT

A mini-extruder apparatus for extruding small quantities of material. The apparatus is designed to overcome the problems of excessive heat transfer from the heated portion of the barrel to the feed portion of the extruder barrel and the premature failure of the long thin extruder screws employed in extruders. The mini-extruder includes an extruder barrel having a substantially circumferential, radially extending cavity formed in an isolator portion of the extruder barrel to thermally isolate the feed portion from the heated portion. The mini-extruder also includes a drive system constructed to drive the extruder screw at both ends. The mini-extruder can also be designed as a co-rotating or counter-rotating twin screw extruder where each end of each extruder screw is driven.

17 Claims, 6 Drawing Figures

APPARATUS FOR EXTRUDING SMALL QUANTITIES OF MATERIAL

FIELD OF THE INVENTION

This invention relates to extrusion devices for processing small quantities of material. More particularly, it relates to a novel mini-extruder for processing small experimental quantities of materials such as polymers. Specifically, the invention relates to a system for driving the extruder screw and an isolator portion incorporated in the extruder barrel for limiting heat transfer between the feed portion and the heated portion of the extruder barrel.

BACKGROUND OF THE INVENTION

Conventional single and twin screw extruders for laboratory use have been available from manufacturers. Technical literature describing such single and twin screw laboratory scale extruders includes: *Leistritz Applications Bulletin,* American Leistritz Extruder Corporation, 1983; *Leistritz Information-Technical Bulletin 20,* Leistritz Maschinenfabrik GmbH, 1980; *Leistritz Information-Technical Bulletin 22,* Leistritz Maschinenfabrik GmbH, 1980; and, *Leistritz Extrusilnstechnik,* Leistritz Maschinenfabrik GmbH, October 1979. The single and twin screw extruders described in the literature process materials at a rate of about 15 g/minute to more than 180 g/minute. The extruder barrels are heated and portions of the heated section include heaters coupled with forced cooling to regulate the amount of heat supplied thereto. The extruder screws are driven at one end. Another example of such extruders is described in *Egan Extruders—Bulletin No.* 202, Frank E. Egan & Company, October 1968.

In addition, there are a number of technical papers available which discuss general characteristics of twin screw extruders including: Chris J. Rauwendaal, "Analysis and Experimental Evaluation of Twin Screw Extruders," *Polymer Engineering and Science,* Volume 21, No. 16, November 1981, pages 1092–1100; William Thiele, "Expanding Uses for Counter-rotating, Intermeshing, Twin Screw Extruders," (undated), American Leistritz Extruder Corporation; and, William Thiele, "The Counter-rotating Twin Screw: An Alternative Machine Approach," reprint from *Plastics Compounding* (1981, Industry Media Inc.). Laboratory scale models of twin screw extruders are also described in these papers.

None of the literature discloses extruders including either an isolator section for isolating the cooled feed zone of the extruder barrel from the heated zone of the extruder barrel or a dual end drive system for driving both ends of the extruder screw.

Conventional extruders process material at rates between about 15 g/min and about 3300 g/min depending on process parameters and the size of the equipment. In the spinning of filaments, for example, the time required to reach steady state in the process is about 20–30 minutes. At a 15 g/min processing rate, approximately 300–450 g material would be consumed. Thus, conventional extruders are not suitable for efficient processing of small experimental quantities of material ($\leq 100$ grams) requiring throughput rates less than about 5 g/min and preferably between about 0.05–1.5 g/min.

The obvious solution of scaling down conventional extruders to meet the small throughput requirements for processing experimental quantities of materials is not acceptable. One major problem with scaling down conventional extruders to process small quantities of material is controlling the large thermal gradient which is present along a very short length of the scaled-down extruder barrel. More specifically, the feed portion of the extruder, which constitutes about 1/5 of the total length of the barrel and includes the feed hopper, feed tube and a first feed zone, must be kept at a temperature less than about 80° C. to prevent premature softening of the material. At the same time, the melting and processing portion (heated portion) of the extruder barrel, which constitutes about ½ or more of the total length of the barrel, should be kept at a temperature of at least 150° C. and as high as 350° C. depending on the polymer composition. Reducing the barrel length to about 10 inches or less, as in the instant invention, produces, in the transition portion of the barrel (the portion between the feed portion and the heated portion), a temperature gradient of about 550° C./cm. Thus, with a conventional extruder design, too much heat will reach the feed portion of the barrel and cause the raw material in the feed zone to become viscous and tacky. As a result, the extruder screw cannot feed material through the barrel. Additionally, because of the premature softening, a gravity feed system cannot be employed to supply the extruder. The consequences of employing a force feed system to supply material to the extruder include greater complexity, increased cost and, possibly, added functional problems because of the small amount of material being processed. Conventional laboratory scale extruders solve this problem by increasing the extruder length to maintain the feed portion remote from the heating portion thus eliminating the large thermal gradient. However, an elongated extruder would be too long and bulky for convenient table top use and would require more processing material than would be normally available.

Another major problem with scaling down the conventional extruder is premature failure of the extruder screw. In operation, extruder screws encounter substantial torsional loads caused by the changing viscosity of the material as it travels along the length of the extruder barrel. In order to meet the experimental sample size processing requirements noted before, the extruder screw in a conventional scaled-down extruder will not only have a large length to diameter ratio (about 25:1) but will also be very thin (equal to or less than about ¼ inch in diameter). Thus, driving the long thin extruder screw at one end only, as is conventional, in a scaled-down conventional extruder would result in premature failure caused by twisting and/or breaking of the screw. This problem would be amplified in the conventional laboratory scale extruders which use combined heating and cooling units to gradually control the heat supplied to the barrel.

We have invented an advantageous and improved extruder apparatus for processing small amounts of material. The invention eliminates the heat transfer problem associated with scaled-down conventional extruder apparatus. It also eliminates the problem of premature failure of extruder screws employed in scaled-down conventional extruder apparatus. Additionally, it provides an inexpensive compact bench-top extruder apparatus which is capable of processing material at rates less than about 5 g/min and preferably about 0.05 to 1.5 g/min to produce laboratory specimens. As an added feature, the apparatus employs a simple gravity feed system.

The uses of the extruders are not limited to extrusion of shaped products. Because of the size of the apparatus, it can be conveniently used as an injector for feeding material to another extruder or some other device. In addition, it can also be used to measure the viscosity of liquids using the following known equation:

$$\frac{\Delta PR}{2L} = \mu \frac{4Q}{\pi R^3} \quad (1)$$

where $\Delta P$= pressure drop over the length of the nozzle or die outlet; $R$= radius of the nozzle or die outlets; $L$=lengths of the nozzle or die outlet; $Q$= flow rate from the nozzle or die outlet; and $\mu$= the viscosity of the liquid.

Since $\Delta P, R, L$ and $Q$ are measurable quantities, the viscosity ($\mu$) can be calculated. Other uses are apparent from the detailed description of the invention included herein.

SUMMARY OF THE INVENTION

The present invention is an extruder apparatus for processing small quantities of material which eliminates heat transfer problems occurring along the extruder barrel and premature extruder screw failure in small scale extruder apparatus. The apparatus comprises an extruder barrel for processing and feeding material to an outlet, the barrel having an axial bore defined therein for transporting material to the nozzle and comprising a feed zone with an associated gravity feed mechanism, a heated zone and an isolator zone arranged between the feed zone and heated zone. A substantially circumferential slot which comprises a thermal isolation means is defined in the isolator portion of the barrel for reducing heat transfer between the heated portion and the feed portion of the barrel. Any of a variety of suitable outlets is associated with an exit end of the heated portion of the barrel. At least one extruder screw is disposed within the barrel for transporting material along the bore to the nozzle and a drive mechanism is associated with the extruder screw or screws for driving the screw or screws at each end thereof. The method for extruding the material comprises the steps of: gravity feeding material into the feed zone of the barrel bore; cooling the feed zone of the barrel; and, transporting the material from the feed zone of the barrel bore, through the isolator zone of the barrel bore, then to the heated zone of the barrel bore and then through a nozzle which is coupled to an exit end of the heated zone of the barrel bore. The invention can be more fully appreciated from the following brief description of the drawings, detailed description of the invention and appended claims.

DETAILED DESCRIPTION OF THE INVENTION

Figure 1:
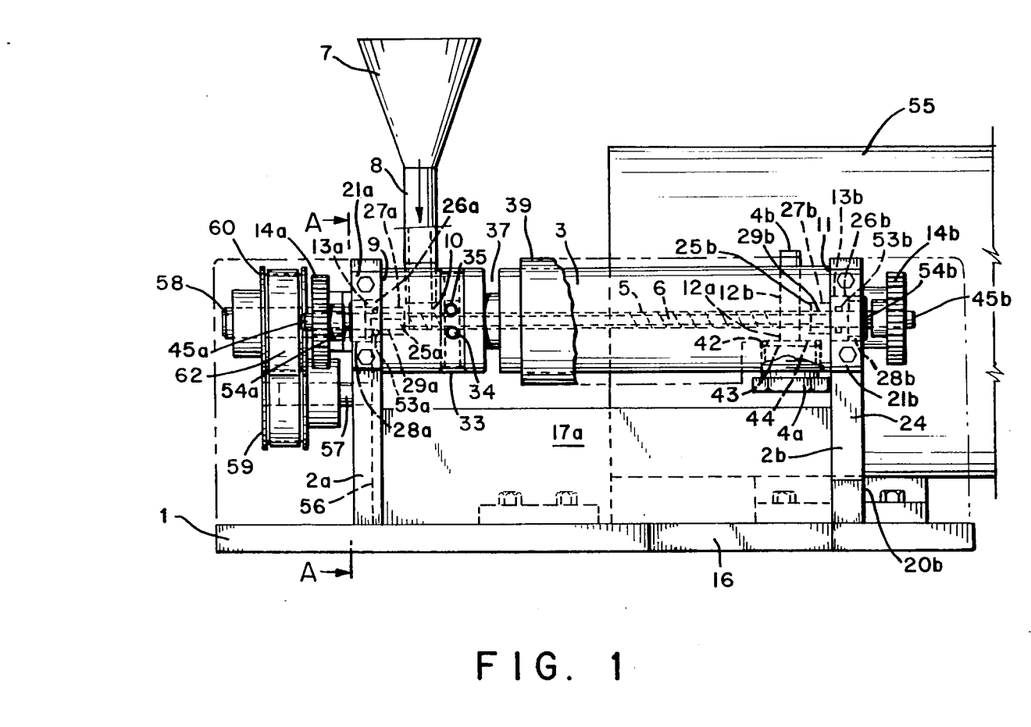
FIG. 1 is a cross sectional side elevational view of one embodiment of the apparatus of the present invention.
Figure 2:
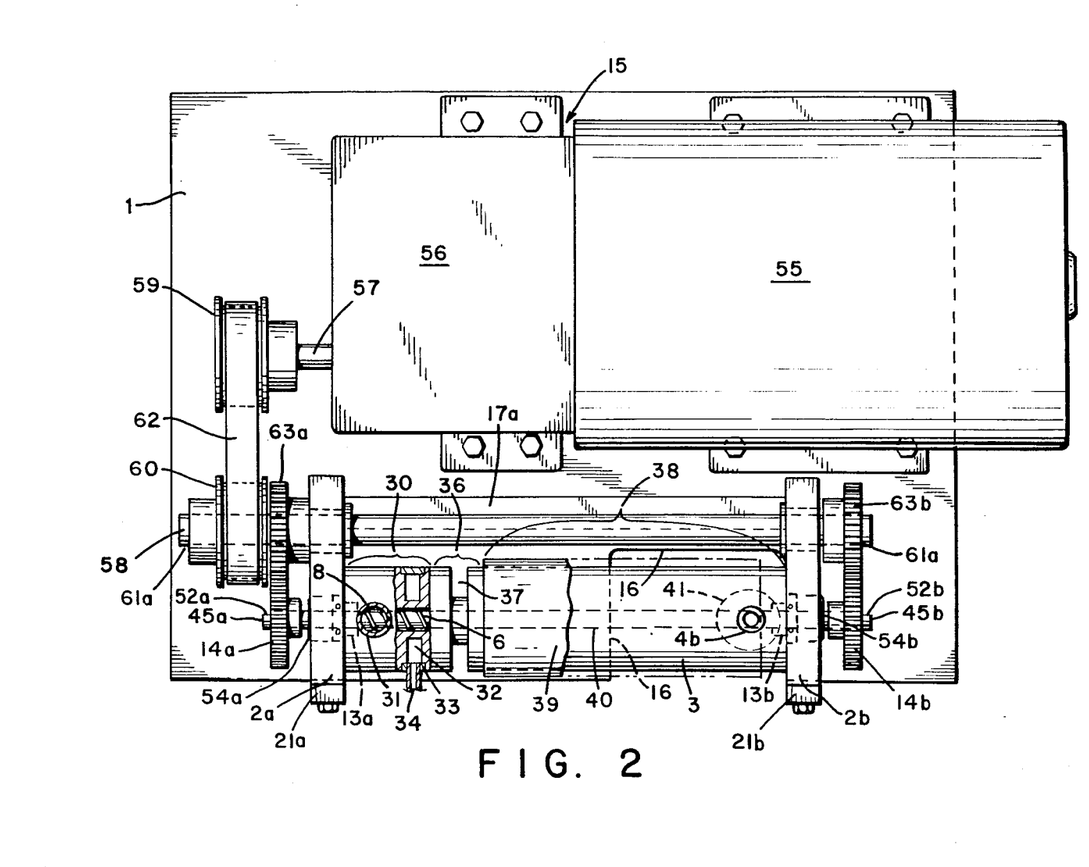
FIG. 2 is a top plan view of the embodiment depicted in FIG. 1 with the cooled feed portion and isolator portion of the extruder barrel sectioned for better appreciation of the present invention.

As shown in FIG. 1, the apparatus comprises a support base 1 provided with upstanding brackets 2a, 2b for supporting an extruder barrel 3 which processes material to be extruded through a die 4a or nozzle 4b. The extruder 3, preferably cylindrical in shape and constructed of a temperature resistant material such as H13 tool steel, has an axially extending barrel bore 5 defined therein through which extends an extruder screw 6. Preferably, both the barrel bore 5 and the extruder screw 6 are generally cylindrical. A gravity feed hopper 7 and an associated hollow feed tube 8 are arranged at a first end 9 of the extruder barrel 3 and communicate with the barrel bore 5 via an extruder feed passage 10. In some embodiments, material is fed to the die 4a arranged near a second end 11 of the extruder barrel 3 and communicating witht eh barrel bore 5 via a die supply passage 12a. In other embodiments, material is fed to nozzle 4b arranged near the second end 11 and communicating with barrel bore 5 via a nozzle supply passage 12b. Closure means (not shown) are provided to selectively close passage 12a or 12b depending on the intended use to the apparatus. Couplings 13a, 13b, housed at least partially in upstanding brackets 2a and 2b, respectively, and coupled to the extruder barrel 3 at the first end 9 and the second end 11 thereof, function to support the extruder barrel 3 and the extruder screw 5. The extruder screw 5 is provided with driven gears 14a, 14b, one at each of the end of the extruder screw, which are powered by a drive system 15 as is best seen in FIG. 2.

The support base 1 for the extruder apparatus is described with reference to FIGS. 1 and 2. The support base 1 is constructed from any suitable structural material such as steel. The support base is preferably provided with a number of through holes (not shown) arranged to receive screws or bolts (not labeled) for mounting the upstanding brackets 2a, 2b and the drive system 15 thereto although any suitable fastening mechanism can be used to mount the brackets and drive to the base. As shown in FIG. 2, it is preferred to provide the support base 1 with a cut out portion 16 located beneath the extruder die 4a. The cut out portion 16 allows extruded material to be collected at a located beneath the support base 1.

Figure 3:
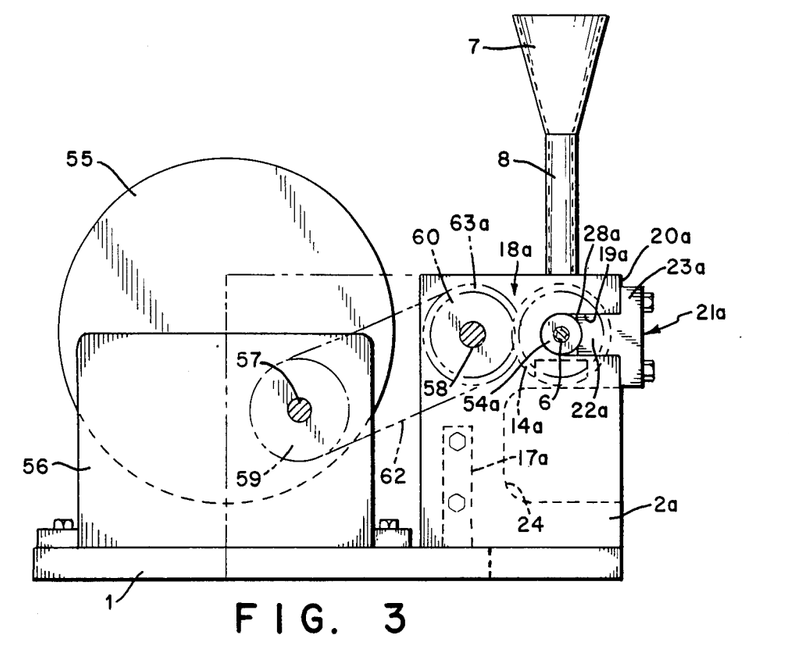
FIG. 3 is a section view taken along the line A—A of FIG. 1 with certain elements removed for clarity.

The upstanding brackets 2a, 2b are also constructed from any suitable structural material sucha s steel. As best seen in FIG. 3, the upstanding bracket 2a is preferably a generally rectangular plate having an support member 17a journaled thereto on a surface remote from the major surface of upstanding bracket 2a shown in this figure. Both the upstanding bracket 2a and the cooperating support 17a are detachably mounted to the support base 1. Upper portion 18a of upstanding bracket 2a is provided with a cut out portion 19a which opens along a front surface 20a of upstanding bracket 2a. The cut out portion 19a is sized to receive a part of coupling 13a. Clamp 12a has a stem portion 22a adapted to fit within the cut out portion 19a and a head portion 23a larger than the vertical height of the cut out portion 19a. The clamp 21a is detachably fastened to the upper portion 18a of upstanding bracket 2a by any suitable means such as screws (not labeled). Upstanding bracket 2b is substantially a duplicate of upstanding bracket 2a in all respects except for a large cut out section 24 opening along a front surface 20b of upstanding bracket 2b. The large cut out section 24 provides easy access to the die 4a and allows for extraction of extruded material from the side of the apparatus. For comparison purposes and future reference, all other elements of the upstanding brackets 2b are designated by the same reference numeral as for the corresponding element of upstanding bracket 2a suffixed by "b".

The extruder barrel 3 is supported above the support base 1 on the upstanding brackets 2a, 2b by couplings 13a, 13b. The couplings 13a, 13b are preferably hollow bushings, each having a small outer diameter portion 25a, 25b and a concentrically arranged larger outer diameter portion 26a, 26b. The smaller outer portion diameter portion 25a, 25b is sized for engagement with barrel cut out section 27a, 27b, respectively. The larger outer diameter portion 26a, 26b of each coupling 13a, 13b is sized to engaged surfaces 28a, 28b respectively of small cut out portions 19a, 19b. Longitudinally extending passageways 29a, 29b of couplings 13a, 13b accommodate ends of the extruder screw 6.

The extruder barrel 3, as seen in FIG. 2, is divided into three regions, one of which is a material feed portion 30. The material feed section includes a feed zone 31 of the barrel bore 5 and a feed passage 10. In the preferred embodiment, feed passage 10, which communicates with the feed zone 31 of the barrel bore 5, is directed radially upwardly therefrom and communicates with gravity feed hopper 7 through detachably mounted feed tube 8. The gravity feed hopper 7 and feed tube 8 can be constructed of any suitable material and are preferably constructed of lightweight material such as thin plastic of sheet metal. These lightweight materials can be used for the feed hopper and feed tube without fear of deformation or melting because of the novel thermal isolator employed by the present invention. Although the gravity feed arrangement is ideally suited, any suitable feed system could be employed without departing from the major improvements embodied in the present invention.

The material feed portion 30 also includes at least one substantially circumferential groove 32 which functions to cool the feed portion 30. The groove is preferably a single radially extending channel of U-shaped cross section although any of a variety of designs are equally usable. The groove 32 is provided with a cover 33 extending entirely over the circumferential extent of the groove 32. The cover 33 includes a coolant inlet paasage 34 and a coolant outlet passage 35. A partition can be provided within the groove 32 between the inlet passage 34 and the outlet passage 35 to ensure continuous circumferential flow of coolant along the groove 32. Any suitable coolant can be employed, such as air or water.

Figure 4:
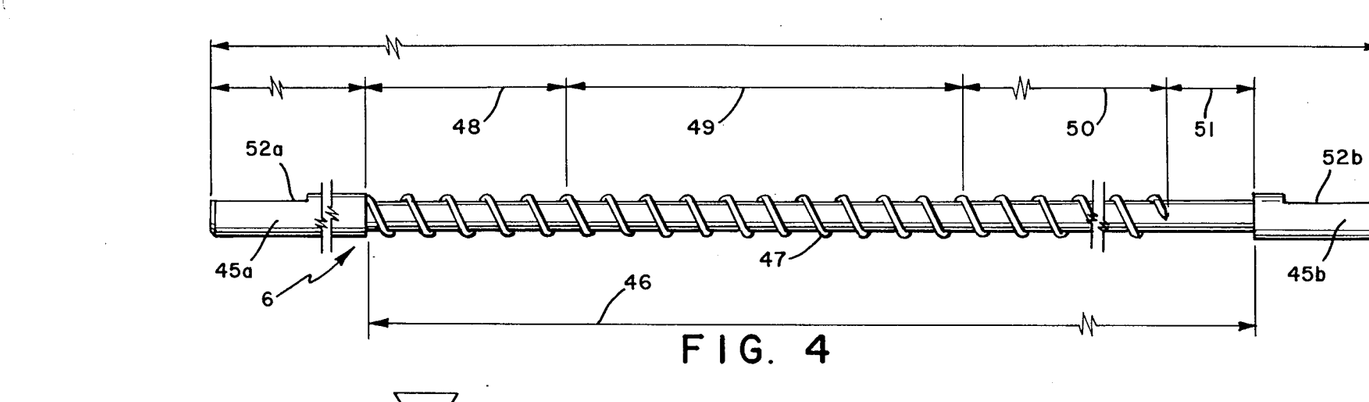
FIG. 4 is a cross sectional side view of a preferred extruder screw employed in the present invention.

Downstream of and adjacent to the material feed portion 30 is an isolation portion 36. The isolator portion 36 is defined by at least one substantially circumferential groove 37 which functions to thermally isolate the material feed portion 30 from the remainder of the barrel. The groove 37 can be of any cross sectional shape which performs the function of isolating the material feed portion from the remainder of the barrel. However, the groove 37 must not be cut so deeply into the barrel as to weaken the structural integrity of the barrel or to cause warpage of the barrel. The width of the groove is preferably between about 0.05 and 0.75 inches and the depth of the groove measured radially from the barrel external surface is generally between about 0.1 and 0.5 inches. In a preferred embodiment, for a 0.25 inch diameter barrel bore with an external barrel diameter of 1.75 inches, the radial depth of the groove 37 is preferably about 0.5 inches. If needed, more than one groove can be provided to define the isolator portion 36. Furthermore, additional grooves (not shown) may be provided along the length of the extruder barrel is reduced heat transfer at other locations is desired. For example, an additional isolator can be formed int eh extrudes barrel at a location corresponding to a change in the extruder screw design from a melting zone 49 (FIG. 4) to a compression zone 50 (FIG. 4).

The heated portion 38 of extruder barrel 3 is located adjacent and downstream of the isolator portion 36. A heater 39 surrounds the heated portion 38 of the extruder barrel 3 and melts the material in a heated zone 40 of the barrel bore 3 before it is fed to the supply passage 12a or 12b. The heater 39 is closely associated with the extruder barrel 3 to avoid radiation to other parts of the apparatus. Any suitable heater can be employed such as an electrical resistance heater, an induction coil, etc. Preferably, the heater is an electric heater such as a 400 w/230 v heater manufactured by Industrial Heater Co., Inc., Bronx, NY. Any heater employed should be capable of heating the material in the barrel bore to at least about 320° C. The heating portion 38 also includes the detachably mounted die 4a which communicates with the heated zone 40 through die supply passage 12a or, alternatively, the detachably mounted nozzle 4b which communicates with the heated zone 40 through nozzle supply passage 12b.

The die 4a is detachably mounted to the extruder barrel 3 at cut out area 41. The die 4a and cut out area 41 are provided with complimentary screw threaded surfaces which allow for easy replacement of the die depending on the desired product configuration. A sealing member 42, such as an O-ring, is arranged between a to surface 43 of the die 4a and cut out area defining surface 44 to prevent leakage of material from the extruder barrel 3.

The shaping outlets of the die 4a are configured depending on the product desired. For example, the shaping outlet may be designed to form ribbons, filaments or rods of desired cross-sections. In another configuration, the die may be spinnerette assembly for forming fine monofilament materials or a spinnerette assembly for forming multifilament products such as yarn.

The nozzle 4b is detachably mounted to the extruder barrel 3 to communicate with nozzle supply passage 12b. the nozzle 4b is configured depending on the desired use. For example, the nozzle can have a single orifice when functioning as an injector for feeding material to an extruder. Alternatively, the nozzle can have multiple orifices with, for example, one orifice being used to feed material to another extruder and another orifice being adapted to house a thermocouple to measure the temperature of the material in the nozzle.

The extruder screw 6 is disposed within the barrel bore 5 of the extruder barrel 3. The extruder screw 6 transports material along the bore for processing and mechanical working and subsequently feeds the material to the die 4a or nozzle 4b. As seen in FIG. 4, the extruder screw 6 comprises two end sections 45a, 45b and an intermediate section 46. The intermediate section 46 is provided with a helical rib 47 extending axially along a substantial portion thereof. The intermediate section 46 is subdivided into four zones: a feed zone 48; a transition (melting) zone 49; a compression or metering zone 50; and an exit zone 51. The helical rib 47 is defined by an upstream curved edge surface, a land and a downstream curved edge surface. In the preferred extruder screw, along the axially extent of the helical rib from the feed zone through the metering zone, the radius of curvature of both the upstream and downstream curved edge surfaces decreases as does the depth of the helical rib from the land to the base of the helical rib. The exit zone 51 of the intermediate section 46 is not provided with turns of the helical rib. Each end section 45a, 45b is configured to include a flat surface 52a, 52b extending axially along a portion thereof to define keyed-in portions for accommodating the driven gears 14a, 14b.

The intermediate section 46 of the extruder screw 6 and a part of each end section 45a, 45b of the extruder screw 6 are received in the barrel bore 5. In order to prevent leakage of material from the extruder bore 5, gaskets 53a, 53b, such as silicone O-rings, are arranged between the couplings 13a, 13b and the respective end portions 45a, 45b of the extruder screw 6. The extruder screw 6 is retained in proper position by collars 54a, 54b which are detachably sliadably mounted on each extruder screw end portion 45a, 45b. In the embodiment of FIG. 1, the collars 54a, 54b are at least partially received within the cut out portions 19a, 19b of the upstanding brackets 2a, 2b. Each extruder screw end section 45a, 45b extends beyond the upstanding brackets 2a, 2b a sufficient distance to allow for attachment of the driven gears 14a, 14b.

The drive system 15 employed as a part of the present invention includes a motor 55, a gear reduction unit 56 having a main drive shaft 57, a secondary drive shaft 58 rotatably mounted on the upstanding brackets 2a, 2b and a series of cooperating pulleys and gears arranged to drive the extruder screw 6 from both ends 45a, 45b thereof. Referring to FIGS. 2 and 3, motor 55 (e.g., a variable speed D.C. motor) and gear reduction unit 56 (e.g., a Model JK2 reduction unit manufactured by Zero Max of Minneapolis, MN) are detachably mounted to the support base 1. The gear reduction unit 56 includes a main drive shaft 57 provided with an adjustably mounted main drive pulley 59. The secondary drive shaft 58, rotatably mounted on the upstanding brackets 2a, 2b includes a secondary drive pulley 60 arranged at a first end 61a thereof. A timing (pulley) belt 62 is attached to the main drive pulley 59 and the secondary drive pulley 60 to impart rotary movement to the secondary drive shfat 58 from the main drive shaft 57. As best seen in FIG. 2, the secondary drive shaft 58 is provided with longitudinally adjustable shaft gears 63a, 63b. Shaft gear 63b is mounted on second end 61b of secondary drive shaft 58 and shaft gear 63a is preferably mounted on the first end 61a between upstanding bracket 2a and secondary drive pulley 60. The shaft gears 63a, 63b, in turn, cooperate with axially adjustable driven gears 14a, 14b to drive the extruder screw 6 at both ends thereof.

Figure 5:
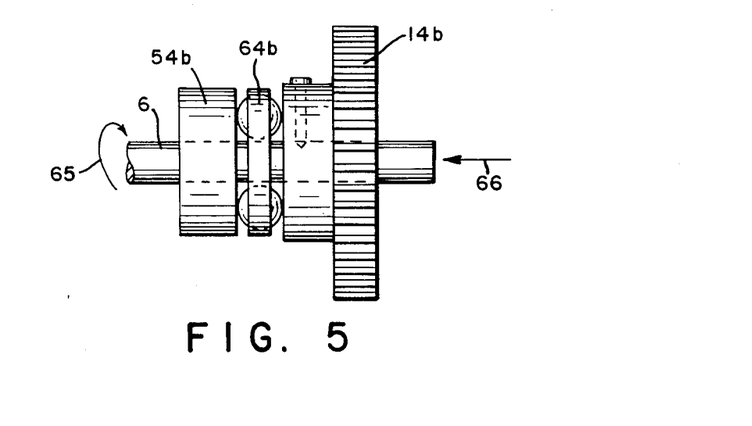
FIG. 5 is an enlarged side view of the gearing and bearing arrangement provided at each end of the extruder screw or screws.

FIG. 5 is an expanded side view of collar 54b and driven gear 14b cooperating with a bearing 64b. In operation, the extruder screw 6 rotates, for example, in the direction of the arrow 65. This rotation produces a force along the longitudinal axis of the extruder screw 6 in the direction of the arrow 66. As a result, the extruder screw tends to shift in the direction of arrow 66. Eventually, the extruder screw 6 would move along the direction of arrow 66 until the driven gear 14b would contact the collar 54b. If collar 54b were stationary, both the collar 54b and the driven gear 14b would prematurally fail as a result of unwanted friction between the parts. In order to eliminate this potential problem, bearing 64b is interposed between the collar 54b and the driven gear 14b. The bearing 64b is a thrust bearing (e.g., Model W-¼ manufactured by Andrews Bearing Corp.). Preferably, a similar thrust bearing (not shown) is positioned between the collar 54a and the driven gear 14a.

Figure 6:
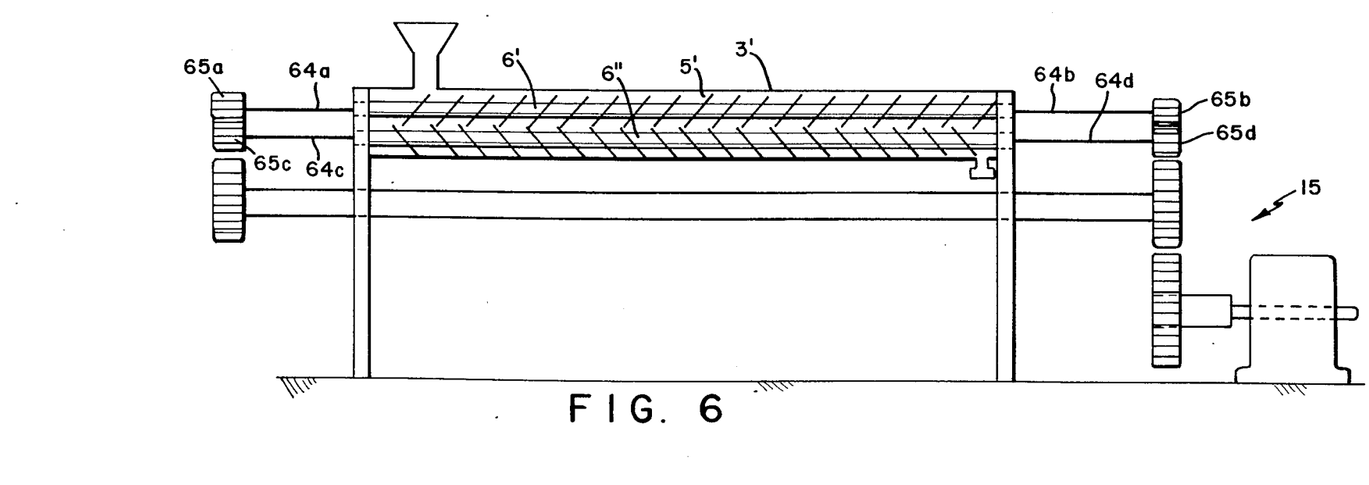
FIG. 6 is a schematic representation of another embodiment of the present invention employing twin extruder screws.

FIG. 6 is a schematic representation of another embodiment of the present invention. As shown, extruder screws 6', 6" are employed within the barrel bore 5' of the extruder barrel 3'. When twin extruder screws are employed they may be configured as co-rotating or counter-rotating screws. Both extruder screws in a co-rotating configuration rotate in the same direction, whether it be clockwise or counter-clockwise rotation. In a counter-rotating configuration, the two screws rotate opposite directions. That is, if one screw rotates in a clockwise direction, the other screw rotates in a counter-clockwise direction.

In the employment of twin extruder screws, only obvious modifications well within the level of skill of an artisan in this art need be made to the drive system 15. For example, a drive system for co-rotating extruder screws could be similar to that shown in FIGS. 1–3 except that the secondary shaft gears would cooperate with a driven gear mounted on each end of the two extruder screws. The driven gears of each extruder screw would, of course, be separated to avoid interaction. Alternatively, a drive system for counter-rotating extruder screws could be similar to that shown in FIGS. 1–3 except that the secondary shaft gears would cooperate with the driven gears of only one of the two extruder screws. The driven gears of the other extruder screw would, of course, directly interact with the driven gears of the one extruder screw. The drive systems described herein, while functioning to set forth a preferred mode of the invention, should not be construed as limiting the scope of the invention as any number of different drives could be employed which would accomplish the same function such as dual synchronous motors for independent drive of each driven gear.

An alternative to the obvious modifications of the drive system 15, for twin screw extruders, is the novel feature of employing flexible connectors 64a–d (FIG. 6) for driving the extruder screws 6',6". In this embodiment, the flexible connectors 64a–d are coupled to driven gears 65a–d and to the respective ends of extruder screws 6',6". This arrangement is particularly advantageous in the event that the extruder screws are so small that direct coupling of driven gears 65a–d to the ends of extruder screws 5',5" is not pratical.

Operations of the apparatus is quite simple. Prior to supplying material to the feed hopper, the appropriate die or nozzle is assembled with the barrel, coolant is supplied to the material feed portion of the barrel, the heated portion is preheated to the proper operating temperature for the material to be processed and the proper feed rate is selected for the process. Material is then fed into the hopper and the extruder screw transfers the material along the bore for processing and subsequently feeding to the die for shaping or to the nozzle for feeding to another device. In operation, the material feed portion is continuously supplied with coolant to ensure that a stable low temperature is maintained in the feed portion of the extruder barrel. Finally, the product is shaped and withdrawn through either the support base cut out or the upstanding bracket cut out or, alternatively, fed to a further processing site.

A typical extruder incorporating the features of the present invention and its operation is described herein. The overall dimensions of the apparatus are approximately 10 inches by 13 inches by 9⅜ inches high. The extruder barrel formed of H13 tool steel, measures approximately 8 inches in length, has an external diameter of 1¾ inches and has a bore diameter of approximately 0.250 inches. The extruder screw, formed of stainless steel, measures 10½ inches in length with a diameter of 0.248 inches and includes an intermediate section 6½ inches in length. The length to diameter ratio of the extruder screw intermediate section, measured from the axis of the feed passage to the axis of the die supply passage, is approximately 25:1. The heater is an electric heater which is capable of raising the barrel temperature to approximately 400° C. The drive system employed was substantially the drive system as described heretofore and includes a variable speed D.C. motor (0–400 rpm) manufactured by Zero-Max. The extruder was operated to produce monofilaments from nylon 6. The die employed was a typical spinnerette with 3 holes (0.010" diameter ×0.040" land length) for producing nylon yarn of 100 denier. Coolant was supplied to the material feed portion at a rate of 0.2 gallons/min to maintain the temperature of the feed section at less than 50° C. while the heater maintained the temperature of the heated zone at 350° C. The isolator portion is a single groove measuring about 0.188 inches in width and about 0.5 inches in depth. Material was extruded at a rate of 0.5 g/minute. The process operated for 60 minutes or longer without problems of premature melting in the feed portion of the bore. The screw, driven at both ends thereof, showed no evidence of excessive strain.

The presently preferred embodiment of the invention has been described in detail to enable one of ordinary skill in the art to practice the invention. It should be understood that the scope of the present invention is not intended to be limited by the detailed description provided herein but is intended to cover modifications, alterations, constructions, equivalents and uses falling within the spirit and scope of the invention as defined by the appended claims.

We claim:

1. An extruder apparatus comprising:
   (a) an extruder barrel for processing material to be fed to a shaping means, said extruder barrel having an axial bore defined therein, the extruder barrel including a feed portion, a heated portion, and an isolator portion arranged between the feed portion and the heated portion;
   (b) feed means communicating with a feed zone of the axial bore defined in the feed portion of the extruder barrel for introducing material to said feed zone of the axial bore;
   (c) heating means disposed about a heated zone of the axial bore defined in the heated portion of the extruder barrel for heating material contained therein;
   (d) outlet means communicating with said heated zone of said axial bore for dispensing material received from the heated zone;
   (e) at least one extruder screw disposed within the axial bore of said extruder barrel and extending from the feed portion through the heated portion of said extruder barrel for transporting material through said axial bore from the feed zone to said outlet means and for forcing material through the outlet means;
   (f) the extruder barrel having surfaces defining isolater means comprising a cavity in the isolator portion of the extruder barrel for thermally isolating the feed portion of the extruder barrel from the heated portion of the extruder barrel.

2. An apparatus as recited in claim 1 wherein said cavity is a substantially circumferential, radially extending cavity.

3. An apparatus as recited in claim 2 wherein said feed portion further includes cooling means comprising a substantially circumferential cavity defined therein and covering means provided to cover said cavity, said covering means having coolant inlet and coolant outlet ports defined therein for feeding coolant to said cavity.

4. An apparatus as recited in claim 1 wherein said surfaces define a substantially circumferential, radially extending groove.

5. An apparatus as recited in claim 1 wherein there are two rotatable extruder screws disposed in said axial bore cooperating as either counter-rotating or co-rotating screws.

6. An apparatus as recited in claim 1 wherein the feed means is a gravity feed device.

7. An apparatus as recited in claim 1 wherein the outlet means is a spinnerette assembly for forming fine filaments.

8. An apparatus as recited in claim 1 wherein the outlet means comprises a die for shaping the material.

9. An apparatus as recited in claim 1 wherein the outlet means comprises a nozzle for injecting material into another apparatus.

10. An apparatus as recited in claim 1 wherein the extruder barrel is a single piece extruder barrel.

11. An apparatus as recited in claim 1 wherein the axial bore of the extruder barrel has a size capable of processing material at a rate less than or equal to about 5 g/min.

12. An extruder apparatus comprising:
   (a) an extruder barrel for processing material to be fed to a shaping means, said extruder barrel having an axial bore defined therein, the extruder barrel including a feed portion, a heated portion, and an isolator portion arranged between the feed portion and the heated portion;
   (b) feed means communicating with a feed zone of the axial bore defined in the feed portion of the extruder barrel for introducing material to said feed zone of the axial bore;
   (c) heating means disposed about a heated zone of the axial bore defined in the heated portion of the extruder barrel for heating material contained therein;
   (d) outlet means communicating with said heated zone of said axial bore for dispensing material received from the heated zone;
   (e) an extruder screw disposed within the axial bore of said extruder barrel and extending from the feed portion through the heated portion for transporting material through said axial bore from the feed zone to said outlet means and for forcing material thorugh the outlet means, the extruder screw being constructed such that both ends of the extruder screw rotate when the extruder screw is driven at one end thereof; and (f) means associated with each end of the extruder screw for simultaneously positively driving the extruder screw at each end thereof.

13. An apparatus as recited in claim 12 further comprising a second extruder screw disposed in said axial bore.

14. An apparatus as recited in claim 12 wherein the feed means is a gravity feed system.

15. An apparatus as recited in claim 12 wherein the outlet means is a spinnerette assembly for forming filament.

16. An apparatus as recited in claim 12 wherein the outlet means comprises a die for shaping the material.

17. An apparatus as recited in claim 12 wherein the outlet means comprises a nozzle for injecting material into another apparatus.

* * * * *